(12) United States Patent
Unterlander

(10) Patent No.: US 10,137,610 B2
(45) Date of Patent: Nov. 27, 2018

(54) POST-MOLD COOLING METHOD AND APPARATUS WITH CYCLONE COOLING EFFECT

(71) Applicant: YUDO ValuePro Lab Canada Inc., Concord (CA)

(72) Inventor: Richard Matthias Unterlander, Nobleton (CA)

(73) Assignee: YUDO VALUEPRO LAB CANADA INC., Concord (CA)

( * ) Notice: Subject to any disclaimer, the term of this patent is extended or adjusted under 35 U.S.C. 154(b) by 0 days.

(21) Appl. No.: 15/790,971

(22) Filed: Oct. 23, 2017

(65) Prior Publication Data

US 2018/0043583 A1     Feb. 15, 2018

Related U.S. Application Data

(62) Division of application No. 14/992,576, filed on Jan. 11, 2016.

(Continued)

(51) Int. Cl.
*B29C 35/16* (2006.01)
*B29C 45/72* (2006.01)
(Continued)

(52) U.S. Cl.
CPC .............. *B29C 35/16* (2013.01); *B29B 11/08* (2013.01); *B29C 45/7207* (2013.01);
(Continued)

(58) Field of Classification Search
CPC ........ B29C 45/7207; B29C 2045/7257; B29C 2045/7214; B29C 2035/1658; B29C 2035/1616; B29C 49/6427; B29C 49/6463
See application file for complete search history.

(56) References Cited

U.S. PATENT DOCUMENTS 6,171,541 B1 * 1/2001 Neter ..................... B29C 35/16
264/328.14
7,481,636 B2 * 1/2009 Volker ................ B29C 49/4268
425/1

FOREIGN PATENT DOCUMENTS

EP        1065035 A2      6/2000
JP        07171888 A  *   7/1995   ......... B29C 45/7207
WO     WO-02087848 A1   11/2002

OTHER PUBLICATIONS

Non-Final Rejection dated Nov. 29, 2017, by USPTO, re U.S. Appl. No. 14/992,576.

(Continued)

*Primary Examiner* — Robert B Davis
(74) *Attorney, Agent, or Firm* — Perry + Currier Inc.

(57) ABSTRACT

A post-molding cooling apparatus directs a stream of cooling fluid against a concave interior surface of a molded article to cool the molded article. The apparatus includes an outlet positioned to direct the stream of cooling fluid into an open end of the molded article. The interior surface of the molded article is concave. The outlet is configured to direct the stream of cooling fluid in a helical direction such that at least a portion of the concave interior surface of the molded article acts as a curved surface relative to a direction of flow of the stream of cooling fluid to create turbulent flow of the stream of cooling fluid against the concave interior surface of the molded article along a length of the concave interior surface from the open end of the molded article toward a closed end of the molded article.

4 Claims, 17 Drawing Sheets

Related U.S. Application Data

(60) Provisional application No. 62/102,764, filed on Jan. 13, 2015.

(51) Int. Cl.
*B29C 49/64* (2006.01)
*B29B 11/08* (2006.01)
*B29K 105/00* (2006.01)

(52) U.S. Cl.
CPC ................ *B29C 2035/1616* (2013.01); *B29C 2035/1658* (2013.01); *B29K 2105/258* (2013.01)

(56) References Cited

OTHER PUBLICATIONS

Partial machine translation of EP1065035A2 dated Jan. 2001 obtained from the espace website.
Partial machine translation of WO02087848A1 dated Nov. 2002 obtained from the espace website.
Partial machine translation of JP07171888A dated Jul. 1995 obtained from the espace website.

\* cited by examiner

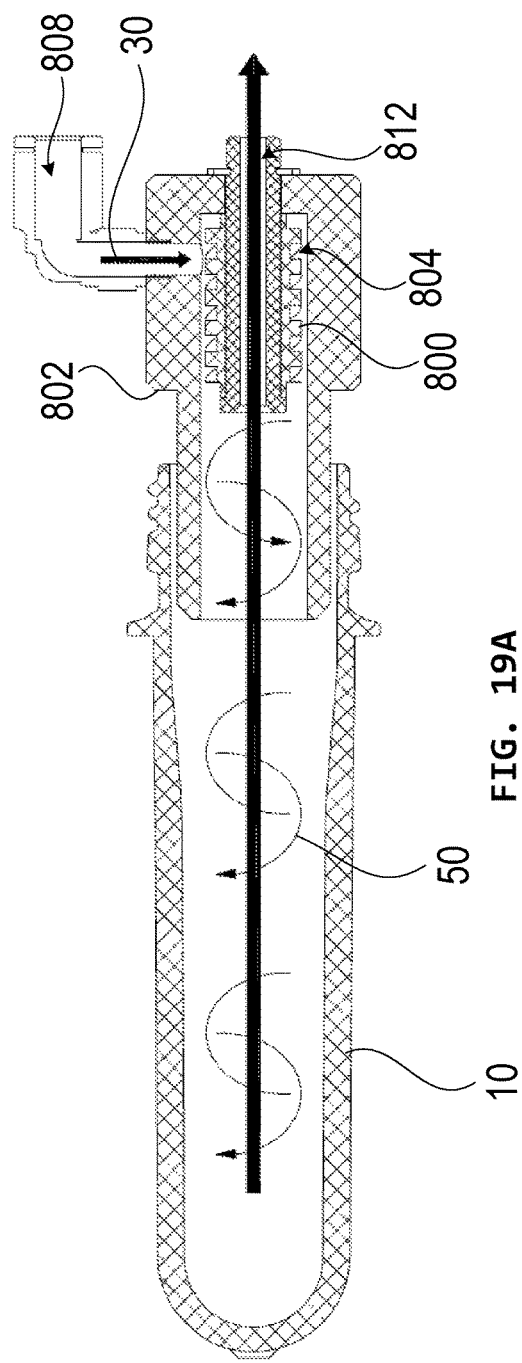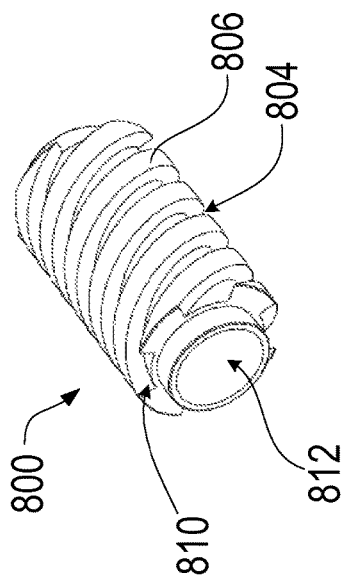
FIG. 19A
FIG. 19B

POST-MOLD COOLING METHOD AND APPARATUS WITH CYCLONE COOLING EFFECT

CROSS-REFERENCE TO RELATED APPLICATIONS

This application claims priority to U.S. app. Ser. No. 62/102,764, filed Jan. 13, 2015, which is incorporated herein by reference.

FIELD

The present invention relates to cooling of molded articles.

BACKGROUND

Post-mold cooling of molded articles is well known and used because thick walls of molded articles, such as preforms, retain heat from the injection molding process. Preforms are usually molded from polyethylene terephthalate (PET) resin and have wall thicknesses in the order of 2.0 mm or more. Because of the resin's very poor thermal conductivity, a substantial amount of residual heat is retained within the preform wall after it has been ejected from the mold. This heat migrates to the inner and outer surfaces of the preform and if not removed, while the preform is held in a form, would cause the preform's surfaces to reheat to the extent that its shape would alter significantly. Further, should the preform be touching another preform, this heat can cause them to weld together.

U.S. Pat. No. 4,592,719 teaches a post mold cooling device comprising a tube that is inserted into a freshly molded preform. The tube extends to the closed end of the preform such that when air is drawn through the tube ambient air is drawn into the interior of the preform from its open end causing an annular flow within the preform, the air reaches the closed end of the tube and continues to flow within the tube to be exhausted via a conduit provided within the tubes mounting plate. Thus the ambient air flow removes heat from the internal surface of the preform via an annular flow stream.

U.S. Pat. No. 4,729,732 teaches a post mold cooling tube into which a freshly molded preform is inserted to continue cooling. A vacuum source is provided at the closed end of the tube to cause the preform to slide toward the closed end as its outer diameter shrinks due to the cooling. The internal surface of the cooling tube is tapered to match the draft angle of the molded preform, so as the preform slides further into the tube its outer surface continues to maintain contact with the inner surface of the tube and continues to transfer heat to the cooling tube. This design was dubbed an "intimate fit" cooling tube, and is widely used today.

U.S. Pat. No. 6,475,422 B1 teaches a cooling pin inserted into a preform while it is being cooled in an intimate fit cooling tube. The pin is a hollow tube that extends near to the closed end of the preform and directs a cooling fluid (air) against the preform's inner surface at the closed end. The fluid then forms an annular cooling stream as it moves from the closed end of the preform toward its open end and vents to atmosphere. This stream of annular flowing air removes heat from the preform's inner surface.

JP 7-171888 teaches cooling the interior of a preform while it is being cooled in a cooling tube by blowing a jet of cooling air from a nozzle spaced apart from the open end of the preform. The nozzle directing the jet of cooling air is aligned coaxially with the longitudinal axis of the preform and the jet of cooling air travels parallel to this axis toward the closed end of the preform. This document also teaches alternately locating the nozzle so as to direct the jet of cooling air parallel to, and along, the inner surface of the preform.

U.S. Pat. No. 6,802,705 B2 teaches cooling the external neck finish of a preform while it is being cooled in an intimate fit cooling tube. A nozzle located near the preform's open end is angled to direct a jet of cooling air such that it flows around the thread finish formed on the external surface of the preform's neck portion to cool that surface. The stream of cooling air follows the spiral shape of the thread finish flowing between, and over, the crests of the thread. There is no teaching of cooling the preform's inner surface by this means.

All these prior art examples of preform cooling, by means of directing a jet of cooling air coaxially along the preform's surface, illustrate laminar flow convection cooling.

SUMMARY OF THE INVENTION

According to one aspect of the present invention, a post-molding cooling apparatus is configured to direct a stream of cooling fluid against a concave interior surface of a molded article to cool the molded article. The apparatus includes an outlet positioned to direct the stream of cooling fluid into an open end of the molded article. The interior surface of the molded article is concave. The outlet is configured to direct the stream of cooling fluid in a helical direction such that at least a portion of the concave interior surface of the molded article acts as a curved surface relative to a direction of flow of the stream of cooling fluid to create turbulent flow of the stream of cooling fluid against the concave interior surface of the molded article along a length of the concave interior surface from the open end of the molded article toward a closed end of the molded article.

The outlet can be angled. The outlet can be angled with respect to a plenum in which the outlet is disposed. The outlet can be provided in an angled nozzle that is angled with respect to a plenum.

The apparatus can further include an insert defining the outlet, the outlet being angled.

The apparatus can further include a helical channel disposed in the insert, the helical channel ending at the angled outlet.

The apparatus can further include a bladed insert defining an angle for the outlet, the bladed insert being insertable into a plenum.

The apparatus can include a plurality of the outlets.

The apparatus can further include a vent tube positioned with respect to the open end of the molded article to convey cooling fluid out of the molded article.

The vent tube can be positioned to extend into the molded article.

The apparatus can further include a cooling rod positioned to extend into the molded article to enhance cooling of the molded article. The stream of cooling fluid flows around the cooling rod.

The cooling rod can contain a liquid cooling circuit.

The apparatus can further include a rotary drive configured to rotate the cooling rod to promote the turbulent flow of the stream of cooling fluid.

The cooling rod can further include external surface features to promote the turbulent flow of the stream of cooling fluid.

According to another aspect of the present invention, a method for post-molding cooling a molded article includes providing cooling fluid at an open end of the molded article, and helically directing the cooling fluid in the molded article such that at least a portion of a concave interior surface of the molded article acts as a curved surface relative to a direction of flow of the cooling fluid to create turbulent flow of the cooling fluid against the concave interior surface of the molded article along a length of the concave interior surface from the open end of the molded article toward a closed end of the molded article.

The method can further include venting cooling fluid out of the open end of the molded article.

The method can further include positioning a cooling rod in the molded article, wherein the stream of cooling fluid flows around the cooling rod.

According to another aspect of the present invention, a molded preform is provided as made according to the method.

BRIEF DESCRIPTION OF THE FIGURES

The drawings illustrate, by way of example only, embodiments of the present disclosure.

FIG. 19A is a cross-sectional side view of a twelfth embodiment of an apparatus according to the present invention.

FIG. 19B is a perspective view of the insert of the twelfth embodiment.

DETAILED DESCRIPTION OF THE INVENTION

A critical factor in understanding cooling (heat transfer) by convection is understanding the boundary layer. In fluid mechanics, a boundary layer is the layer of fluid in the immediate vicinity of a bounding surface where the effects of viscosity (and shear stresses) are significant. It is the region in which heat transfer between a fluid and a surface takes place. Friction is the primary reason for its development.

The fundamental concept of the boundary layer was suggested by L. Prandtl (1904), and defined as a layer of fluid developing in flows with high Reynolds Numbers (Re), that is with a relatively low viscosity as compared with the inertia forces. This relationship is expressed by:

$$Re = \frac{\text{interial forces}}{\text{vicsous forces}} = \frac{\rho V L}{\mu} = \frac{V L}{\nu}$$

where:

V is the mean velocity of the object relative to the fluid;

L is a characteristic linear dimension (traveled length of the fluid);

$\mu$ is the dynamic viscosity of the fluid;

$\nu$ is the kinematic viscosity; and $\rho$ is the density of the fluid.

High Reynolds Numbers are observed when surfaces are exposed to high velocity air streams, where within a relatively thin boundary layer, frictional shear stress (viscous shearing force) may be very large. This association is explained by:

$$\tau(y) = \mu \frac{\partial u}{\partial y}$$

where:

$\tau$ is the frictional shear stress;

$\mu$ is the dynamic viscosity of the fluid;

u is the velocity of the fluid along the boundary; and y is the height above the boundary.

Figure 1:
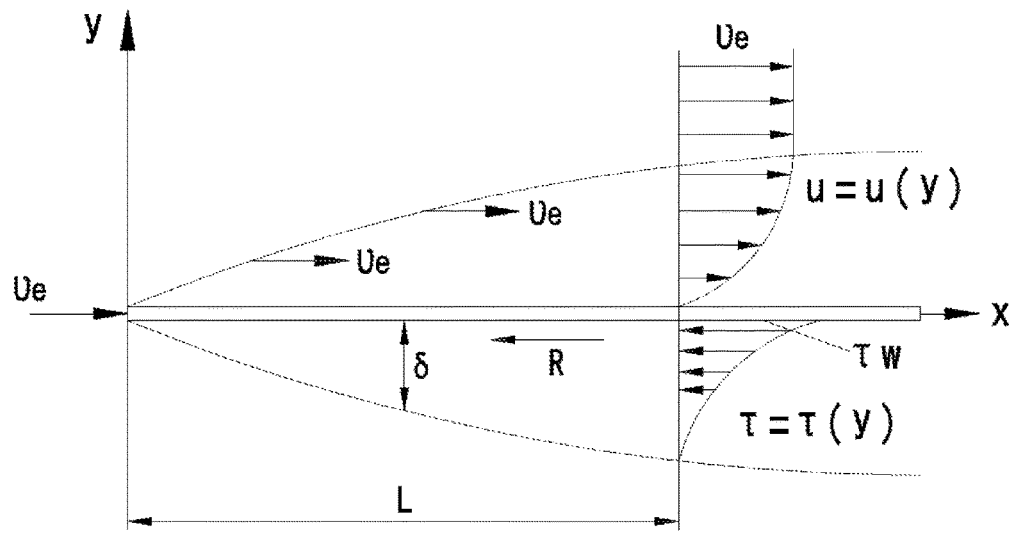
FIG. 1 is a diagram showing growth of a boundary layer on a flat plate.

The flow velocity (u) within the boundary layer varies from zero at the surface (where the flow "sticks" to the wall because of its viscosity) up to the free stream velocity (within 1% error) at the outer boundary edge (see FIG. 1). The boundary layer thickness ($\delta$) defines the friction force zone, which decreases with the distance from the surface, effectively becoming inviscid (having no viscosity) at the outer edge.

In spite of its relative thinness, the boundary layer is very important for initiating the process of dynamic interaction between the fluid flow and the body. This interaction causes a thermal boundary layer to develop (FIG. 2), which governs the thermodynamic interaction of heat transfer.

Figure 2:
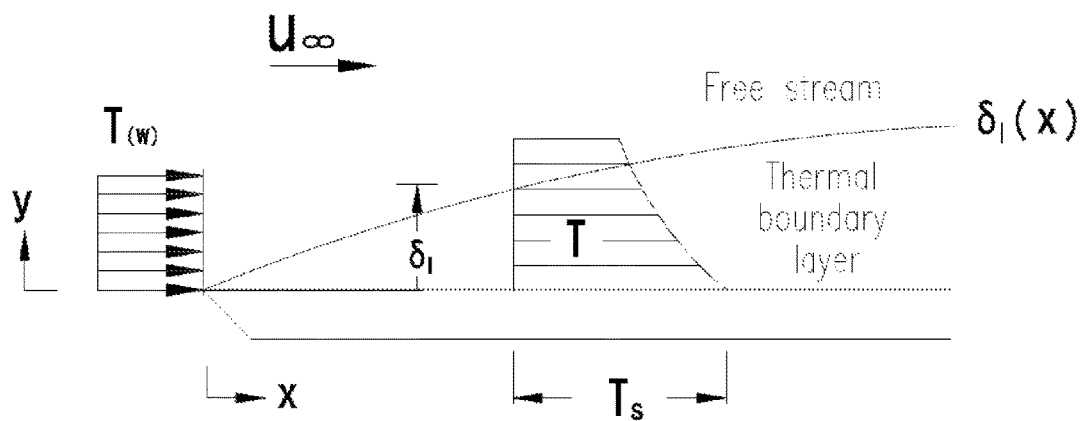
FIG. 2 is a diagram showing thermal boundary layer development of an isothermal plate.

In FIG. 2, T∞ is the temperature of the "free flowing fluid" and Ts is the temperature of the surface. In this case, Ts is higher than T∞, so heat will transfer by convection from the surface to the fluid.

How well the heat transfers from the surface to the fluid is a function of the temperature profile slope through the developed boundary layer. This is expressed by the heat transfer rate equation:

$$q = hA\Delta T$$

where:
q is the rate of heat transfer;
h is the convective heat transfer coefficient;
A is the surface area for heat transfer; and
ΔT is the temperature difference between the surface and the fluid ($T_s - T_\infty$).

The convective heat transfer coefficient (h) has a strong influence on the heat transfer effectiveness, particularly when the surface area is a known constant and the temperature differential is considered the same as compared to similar preform molding processes.

The variable (h) can be considered as the fundamental factor for affecting the heat transfer rate (q), and this is categorically dependent on 1) the physical properties of the fluid and 2) the physical situation (flow conditions and surface geometry).

To relate this rationale to the preform post mold cooling process, the physical properties of the fluid-air (temperature, density, thermal conductivity, specific heat capacity, and viscosity), can be considered to be analogous cooling mediums for comparative cooling methods, and the more relevant physical situation, specifically the flow conditions and surface geometry, can be focused on.

Figure 3A:
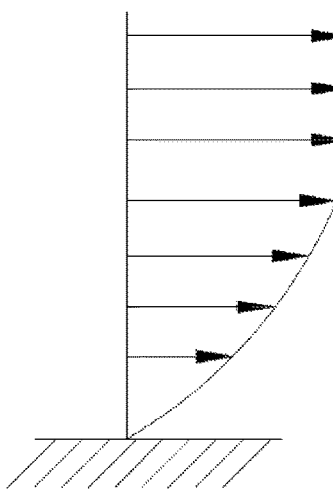
FIG. 3A is a diagram showing a laminar boundary layer.
Figure 3B:
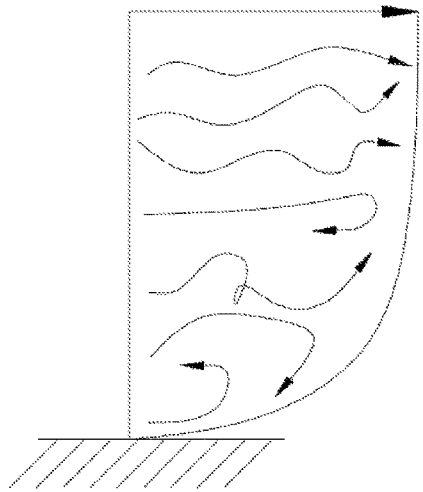
FIG. 3B is a diagram showing a turbulent boundary layer.

Fluid flow can be generalized as either laminar or turbulent. In laminar flow, as shown in FIG. 3A, the fluid moves in lamina or layers of finite speed, with no mixing of the fluid perpendicular to the body surface, i.e., across layers. However, as inertial forces increase (via changes in the flow conditions and/or the surface geometry), the more likely the fluid flow is to become turbulent, and at a certain critical Reynold's number, approximately $5 \times 10^5$ (500,000), there is a natural transition from laminar to turbulent flow. Turbulent flow is less ordered with active mixing of the fluid throughout the boundary layer, as shown in FIG. 3B.

The intense mixing of the fluid in turbulent flow increases the surface friction force (or drag force as it relates to surface shear stress). This enhances momentum and heat transfer between fluid particles, resulting in an increased convection heat transfer coefficient (h), and ultimately an increased heat transfer rate (q).

Figure 4A:
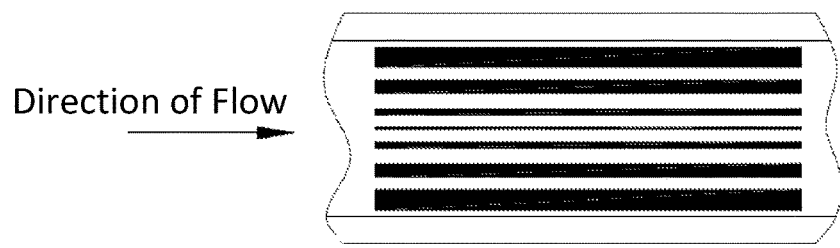
FIG. 4A is a diagram of laminar flow within a cylinder.
Figure 4B:
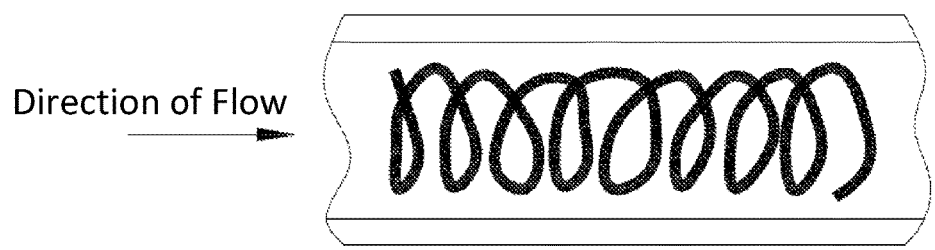
FIG. 4B is a diagram of turbulent flow within a cylinder.

When considering a cylindrical body (such as the interior surface of a preform), FIG. 4A showing laminar flow and FIG. 4B showing turbulent flow illustrate the differences between the two conditions.

Both conditions will remove heat from the surrounding body, but the turbulent flow is profoundly more effective than the laminar flow. With laminar flow, the layers nearest the surface are in direct contact with the heat that needs to be removed, but these layers are highly ordered and move slowly (due to friction), therefore the heat transfers slowly to the faster moving inner layers. The layers closest to the center, which are moving fastest, receive very little heat.

With turbulent flow, the fluid is constantly being tumbled and mixed. It is highly irregular and characterized by random three-dimensional motions of fluid particles. Mixing within the boundary layer carries high speed fluid toward the surface and transfers slower moving fluid farther into the free stream. Essentially, more of the fluid would come into contact with the body surface, all of which would be used to remove heat from the body. This is the desired effect.

With preform post mold cooling processes, turbulent air flow, and more specifically high surface shear stress, is not easily achieved with typical parallel or annular air streams. Furthermore, the interior surface geometry of freshly molded preforms cannot be physically altered to increase the level of turbulence/surface shear stress. However, by utilizing a unique method of directing an air stream across the interior preform surface in a spiral/corkscrew (helical) direction, it essentially causes the interior body of the preform to become a curved/concave surface relative to the direction of the air stream.

Figure 5A:
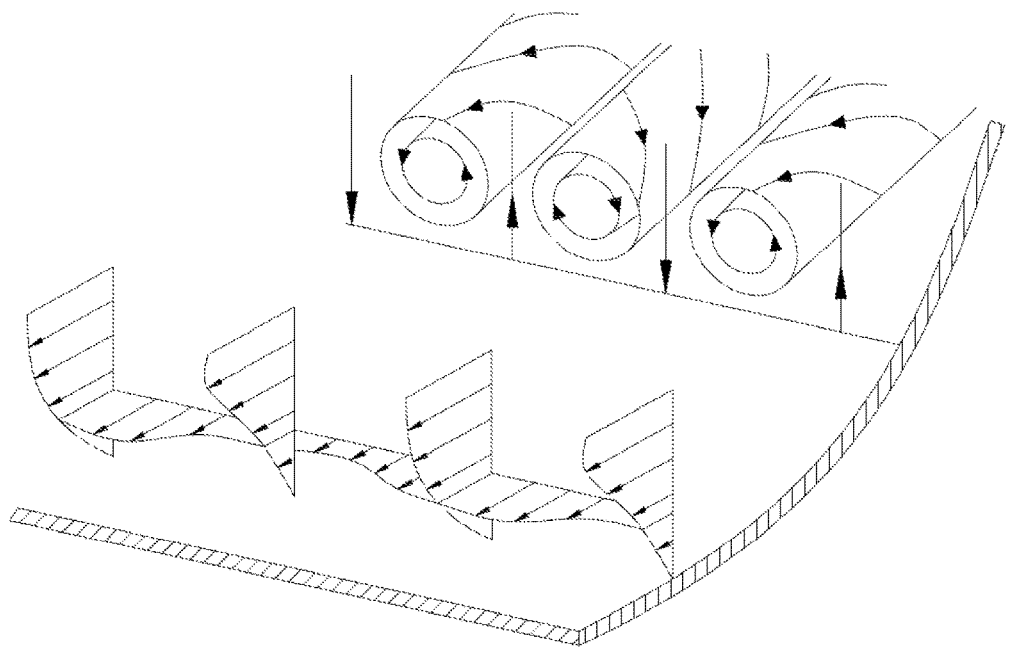
FIG. 5A is a diagram of Goertler vortices in a boundary layer on a concave surface.
Figure 5B:
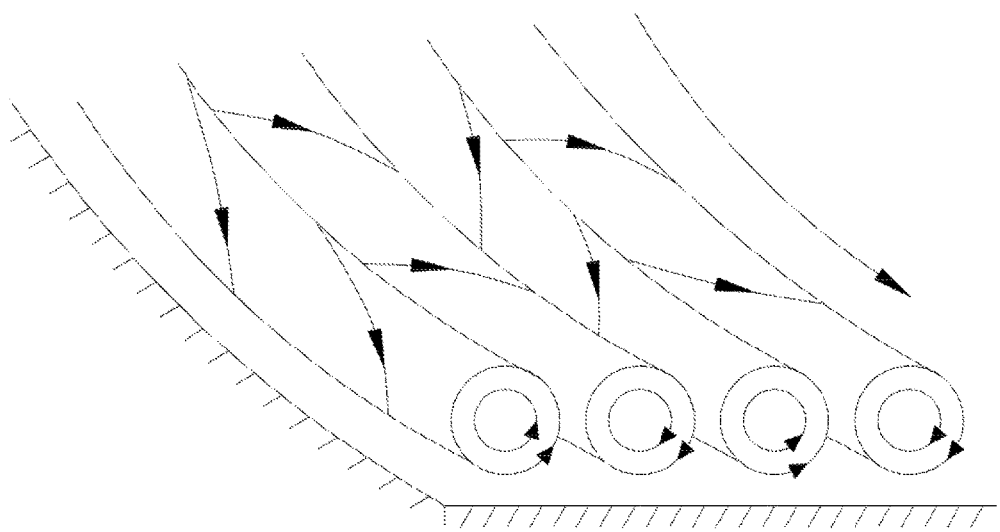
FIG. 5B is another diagram of Goertler vortices in a boundary layer on a concave surface.

The concave surface (now physically exploited with the helical air stream) causes the laminar air flow to transform into a non-uniform three-dimensional pattern, where a turbulent cyclonic centrifugal instability occurs, resulting in the occurrence of stream-wise counter-rotating Goertler vortices (named after Goertler, 1940) as shown three-dimensionally in FIGS. 5A and 5B.

The centrifugal force (the reaction force that is caused by the centripetal acceleration that keeps the air moving along a curved path) is inversely proportional to the surface radius, making it extremely effective for use with preforms, as they typically have small internal diameters (radii). This force also increases as the square of the tangential velocity, producing a massive wall shear effect. The intensified wall shear decelerates the boundary layer air as it flows around the concave surface, creating an unstable situation. The fluid in the inside lanes, with the smaller radius (away from the concave wall), moves faster than that of the fluid near the surface with the larger radius (against the concave wall). This causes the fluid furthest away from the wall to move outward towards the wall, to forcibly exchange places with the fluid near the wall. This sets up a system of counter rotating vortices, whose axes of rotation are parallel to the wall but perpendicular to the main flow direction.

Figure 6:
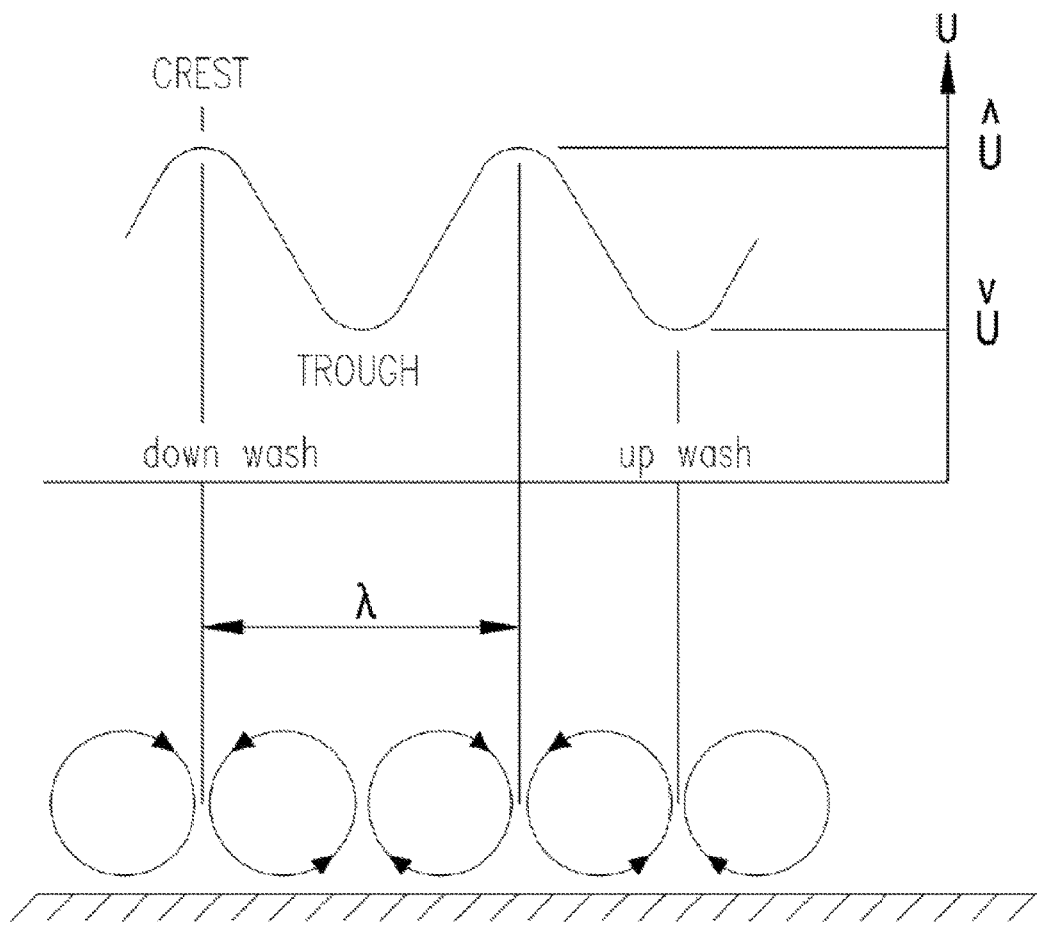
FIG. 6 is a diagram of span-wise distribution of a stream-wise velocity component.

This centrifugal effect is re-illustrated two-dimensionally in FIG. 6. The boundary layer flow is characterized by down-wash regions, where the high speed free stream fluid is swept towards the concave surface, and up-wash regions, where low speed fluid is convected away from the surface, resulting in a wavy fluid distribution in the span-wise direction, within the stream-wise fluid flow path. This highly dynamic effect has an intense impact on the surface turbulence/shear stress, resulting in an elevated heat transfer rate.

In addition, Liepmann (1945) found that the boundary layer transition from laminar flow to turbulent flow on a concave surface occurred at a Reynolds Number much lower than on a flat surface. As such, lower inertial forces are needed to produce an effective heat transfer rate, resulting in a more efficient use of an air source.

This phenomenon can be augmented further by placing a cylindrical object inside the concave cylindrical body, where the two surfaces (concave and convex) induce spontaneous air stream flows, causing shear stress intensification within the boundary layer.

Figure 7:
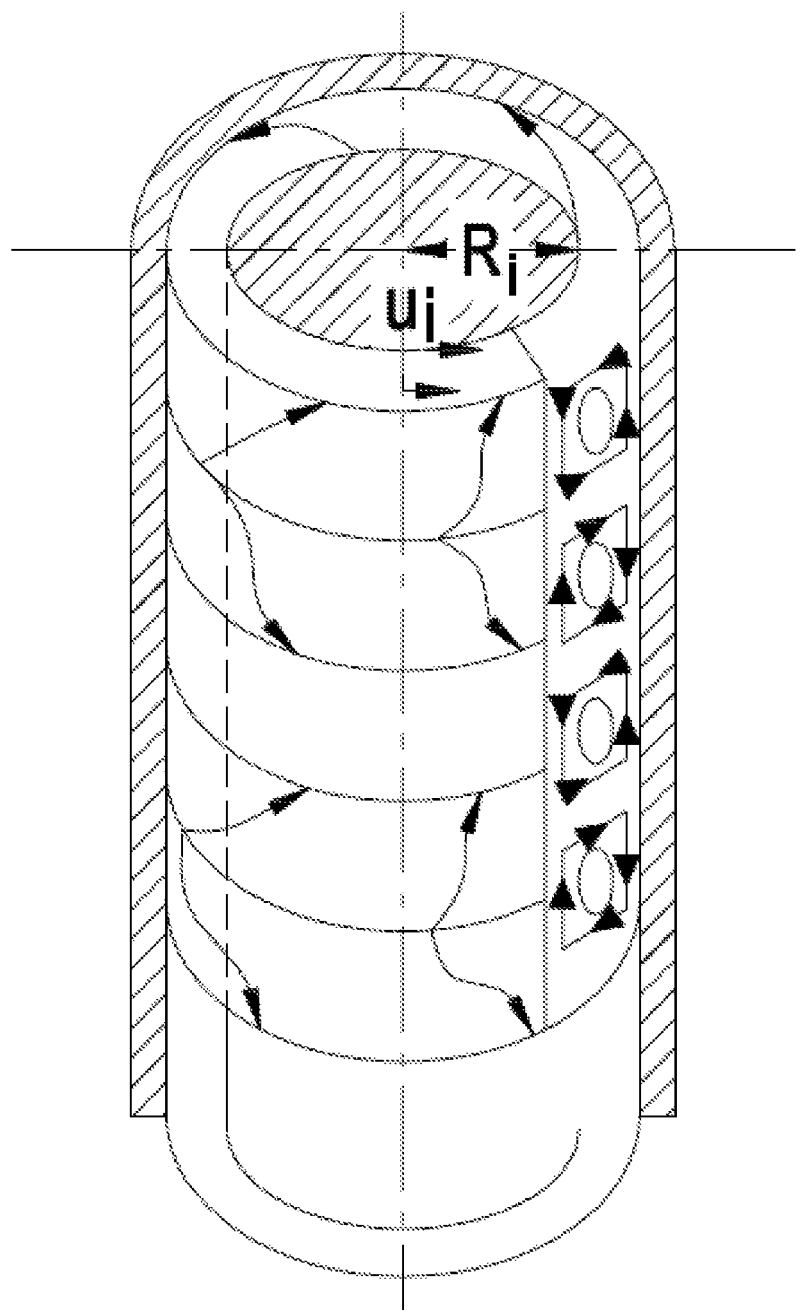
FIG. 7 is a diagram of Taylor vortices formed in an annulus between two cylinders in relative rotation.

A similar effect can also be achieved with the sole rotation of the inside cylinder (that is without the introduction of a forced air stream), where the creation of a steady and smooth circular fluid motion (Couette flow) becomes unstable when the angular velocity of the inner cylinder is increased above a certain threshold, thus generating Taylor vortices (essentially the same Goertler ring vortices although as created in the annulus between the concentric cylinders), as shown in FIG. 7.

When combining the effects of the rotating inside cylinder with the cyclone forced helical air stream in the corresponding (or opposite) rotationally angled direction, immense levels of instable turbulence/wall shear can be produced. A further improvement to this configuration would be to add geometrical surface features and/or surface textures to the inside cylinder to generate even higher levels of turbulence. Incorporating an external cooling medium, for example chilled water, to the inside cylinder, would further benefit the process by raising the convective heat transfer coefficient (h).

In recognizing these phenomena, mechanisms have been designed to realize both:

(1) Improved cooling performance of the interior surface of freshly molded preforms during the post mold cooling process, and (2) Minimized/optimized use of air as the cooling medium to yield a lower cost heat removal medium.

Figure 8:
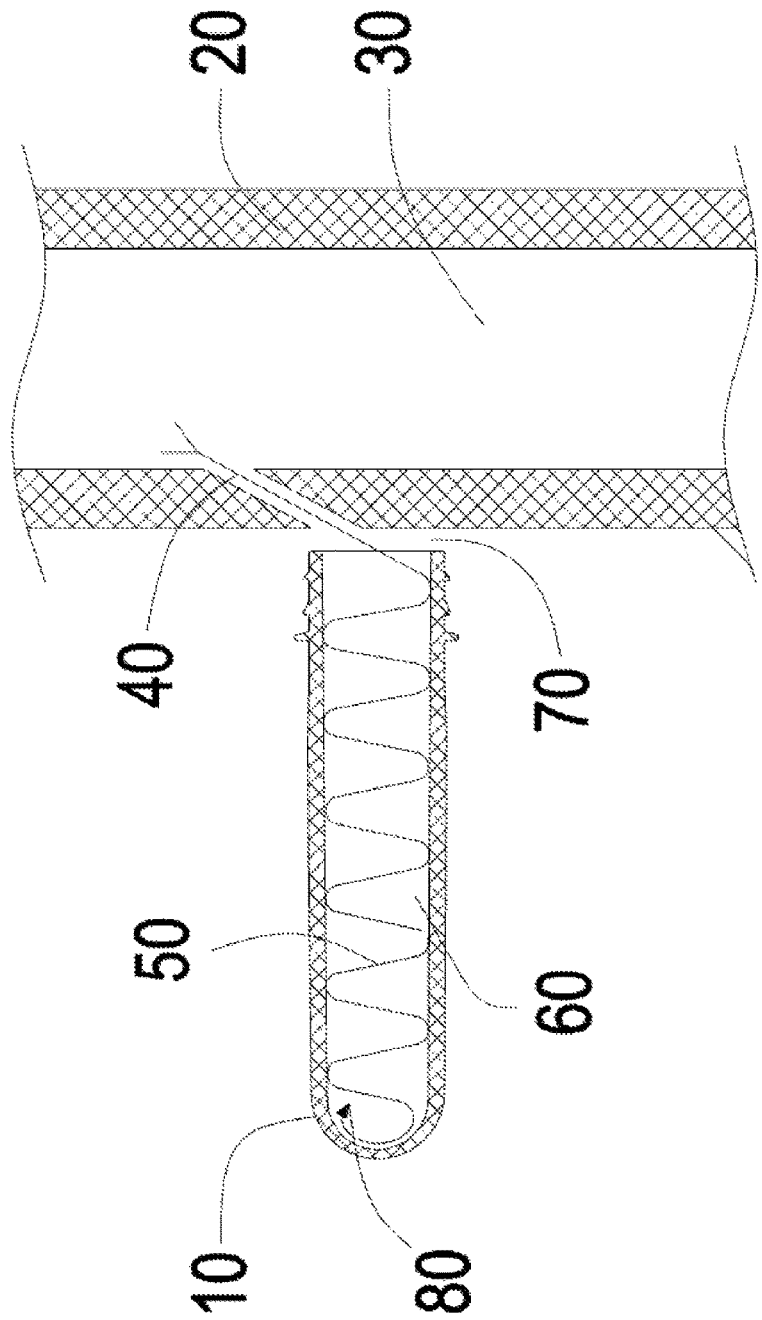
FIG. 8 is a cross-sectional side view of a first embodiment of an apparatus according to the present invention.

FIG. 8 shows a section view of the first embodiment, in which a preform 10 is arranged in a post-molding configuration and supported by any means known to those practicing the art. The preform 10 is spaced apart from a plate, or plenum, 20 containing a source of cooling fluid, such as air under pressure 30. An angled outlet or orifice 40 is positioned such that a stream of cooling fluid 50 is directed into the interior 60 of the preform 10. The direction is both tangential and on an inclined plane to cause the stream of cooling fluid to flow in a helical pattern against the concave interior surface of the preform 10 substantially along its length. Ideally, a series of Goertler vortices are created in the boundary layer optimizing the heat transfer from the preform's interior surface to the stream of cooling fluid. The heated cooling fluid 80 is displaced from the preform's interior via gap 70 by the continuing stream of fresh cooling fluid 50 flowing into the preform.

The plenum 20 can include any combination of mold plates and mechanisms to hold one or more preforms 10 relative to the plenum 20 during cooling. The plenum 20 may be part of an injection molding system, a preform handling or cooling system, or similar. One or more angled outlets 40 may be provided to the plenum 20 or to one or more inserts attached to or within the plenum 20.

Figure 9:
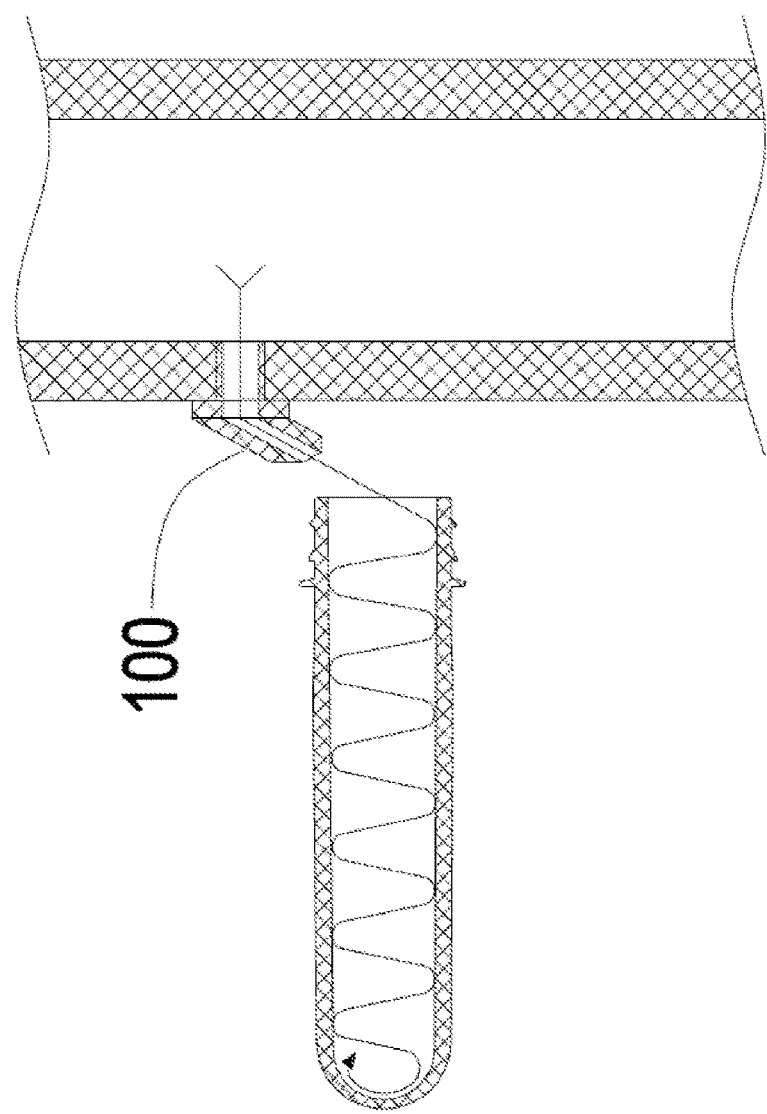
FIG. 9 is a cross-sectional side view of a second embodiment of an apparatus according to the present invention.

FIG. 9 shows a section view of the second embodiment in which the angled outlet is mounted on the plate's surface in an adjustable nozzle 100 allowing the orientation of the outlet to be altered and optimized. The other features and aspects of this embodiment are similar or identical to the first embodiment, with like reference numerals denoting like parts.

Figure 10:
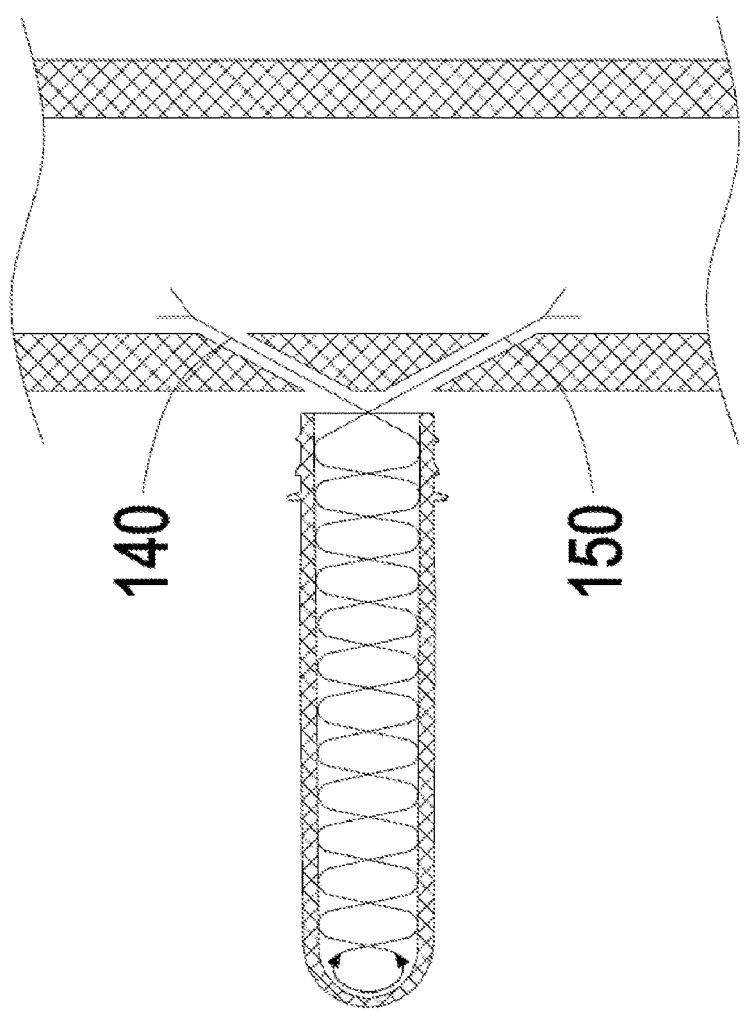
FIG. 10 is a cross-sectional side view of a third embodiment of an apparatus according to the present invention.

FIG. 10 shows a section view of the third embodiment in which two or more angled outlets 140 and 150 are provided in order to increase the flow rate of the cooling fluid and provide better coverage of the inside surface area of the preform, thereby increasing the rate of heat removal from the preform's internal surface. The drawing shows two angled outlets, however additional outlets may be used to enhance performance. The outlets 140 and 150 are aimed to provide the same sense of angular motion (clockwise or counter-clockwise) to the incoming air streams. The other features and aspects of this embodiment are similar or identical to the first embodiment, with like reference numerals denoting like parts.

Figure 11:
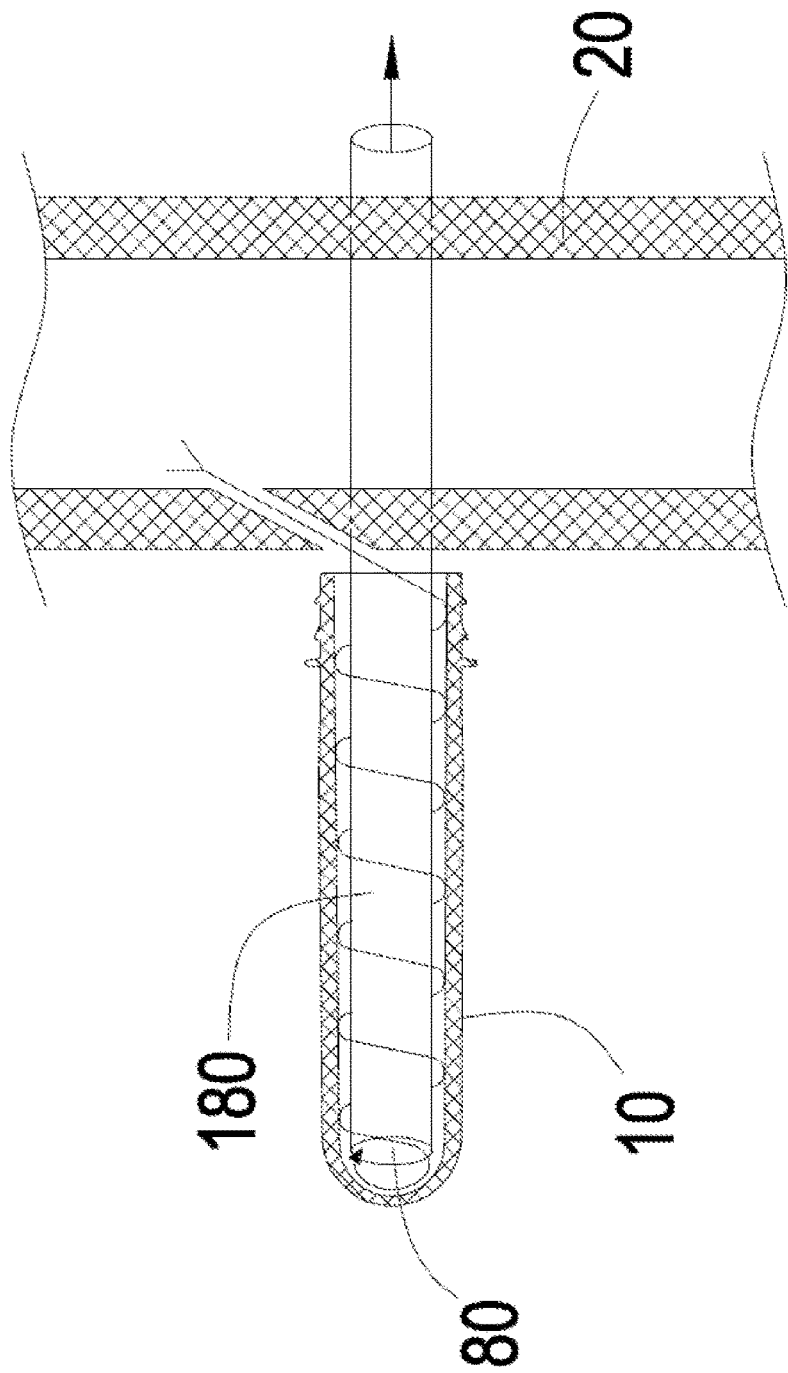
FIG. 11 is a partial cross-sectional side view of a fourth embodiment of an apparatus according to the present invention.

FIG. 11 shows a section view of the fourth embodiment in which a vent tube 180 is provided such that the heated cooling fluid 80 is vented directly from the closed end of the preform 10. The vent tube 180 conveys the heated cooling fluid through the plate, or plenum 20, and exhausts it beyond. The other features and aspects of this embodiment are similar or identical to the first embodiment, with like reference numerals denoting like parts.

Figure 12:
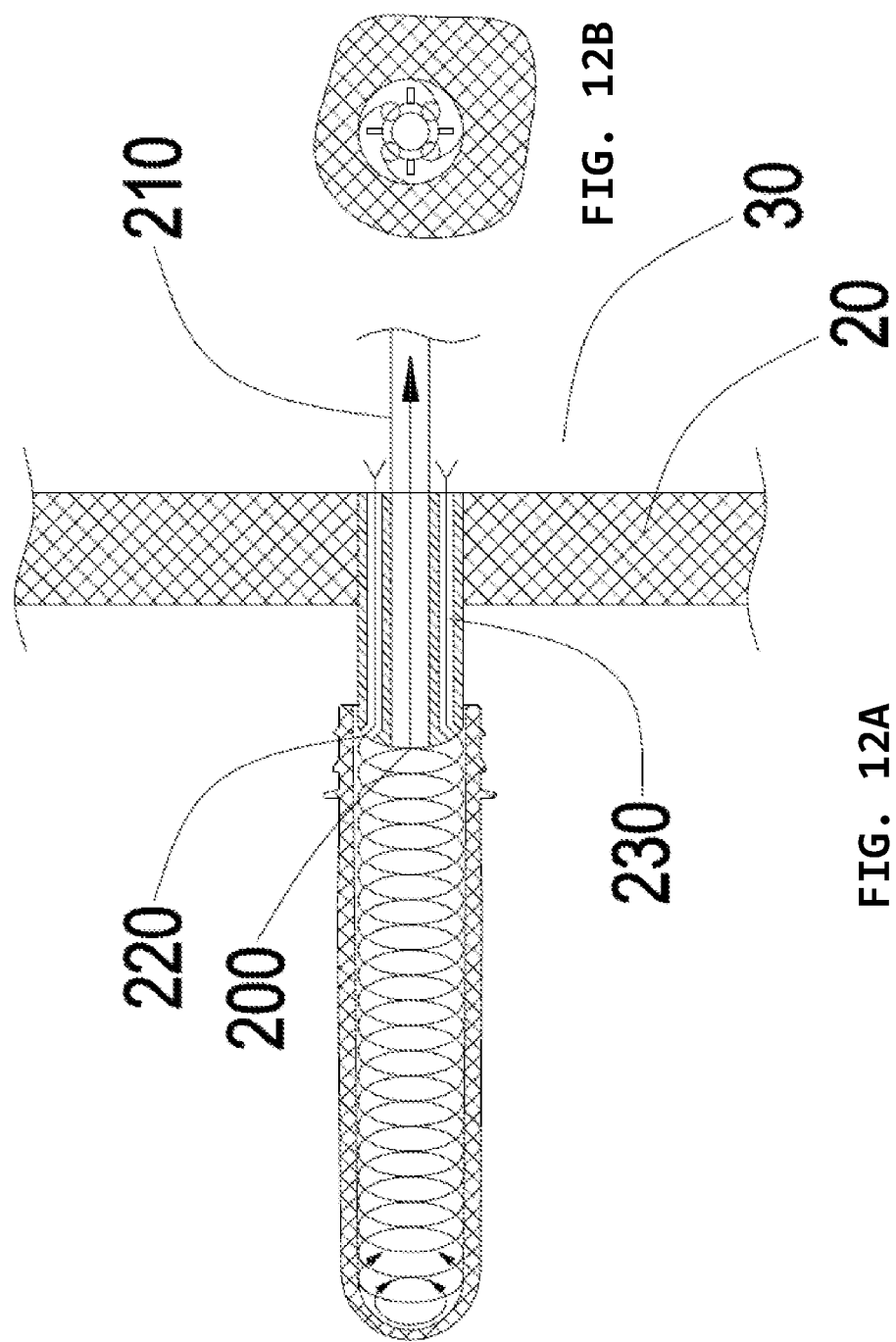
FIG. 12A is a cross-sectional side view of a fifth embodiment of an apparatus according to the present invention.
FIG. 12B is a cross-sectional rear view of the fifth embodiment of an apparatus according to the present invention.

FIGS. 12A and 12B show section views of the fifth embodiment in which a multiport spigot 200 is provided comprising a central vent tube 210 that passes through the plate, or plenum 20 to exhaust the heated cooling fluid beyond, and surrounding the central vent tube 210, multiple angle outlets 220 connected via annular channels 230 to the source of pressurized cooling fluid 30 in the plate, or plenum 20 such that multiple streams of cooling fluid are directed against the interior concave surface of the preform substantially along its length. The spigot size and position can be changed to enter further into the preform interior to obtain the desired effect. The other features and aspects of this embodiment are similar or identical to the first embodiment, with like reference numerals denoting like parts.

Figure 13:
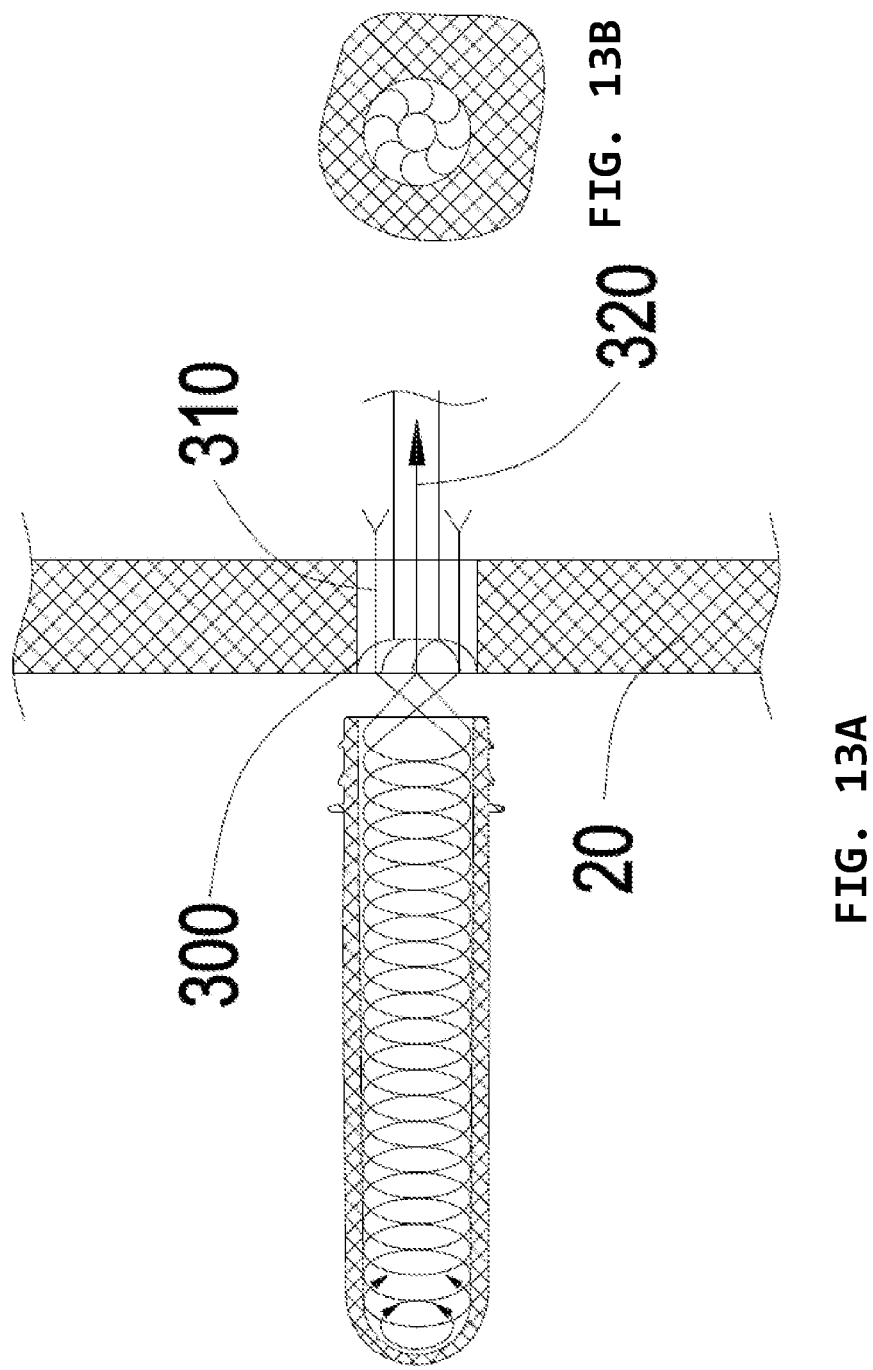
FIG. 13A is a cross-sectional side view of a sixth embodiment of an apparatus according to the present invention.
FIG. 13B is a cross-sectional rear view of the sixth embodiment of an apparatus according to the present invention.

FIGS. 13A and 13B show section views of a sixth embodiment in which a static multi-bladed insert 300 is used to cause the cooling fluid stream, supplied via annular pathway 310, to be directed against the interior concave surface of the preform substantially along its length. A central vent tube 320 is provided that passes through the plate, or plenum 20 to exhaust the heated cooling fluid beyond. The other features and aspects of this embodiment are similar or identical to the first embodiment, with like reference numerals denoting like parts.

Figure 14:
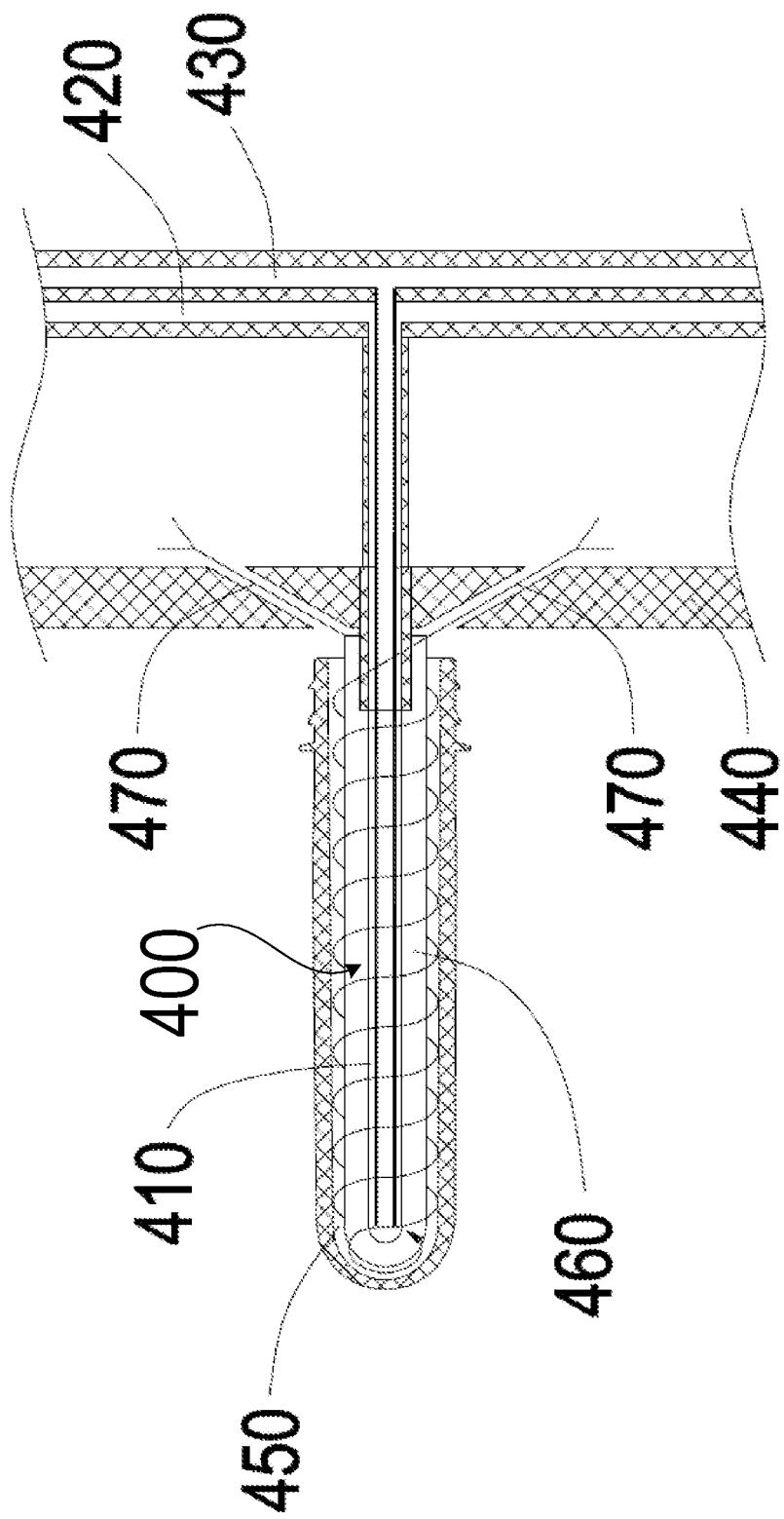
FIG. 14 is a cross-sectional side view of a seventh embodiment of an apparatus according to the present invention.

FIG. 14 shows a section view of a seventh embodiment in which a central cooling rod 400 is inserted into the preform. The cooling rod 400 and the other cooling rods discussed in other embodiments may be hollow with a closed end, or may be solid, and may be termed a "cooled core". In this embodiment, cooling rod 400 contains a water cooling circuit 410 that is supplied by an infeed channel 420 and an exit channel incorporated in the plate, or plenum 440. The length of the cooling rod 400 is long enough to reach the proximity of the closed end of the preform. The rod is surrounded by a cladding of geometrical surfaces or surface textures 460 to enhance the promotion of turbulent flow of the cooling fluid stream 450 supplied via angled outlets 470. The surface texture 460 can be a polished surface, a golf ball texture, a rough surface, a grooved surface, or the like, or any combination thereof. The other features and aspects of this embodiment are similar or identical to the first embodiment, with like reference numerals denoting like parts.

Figure 15:
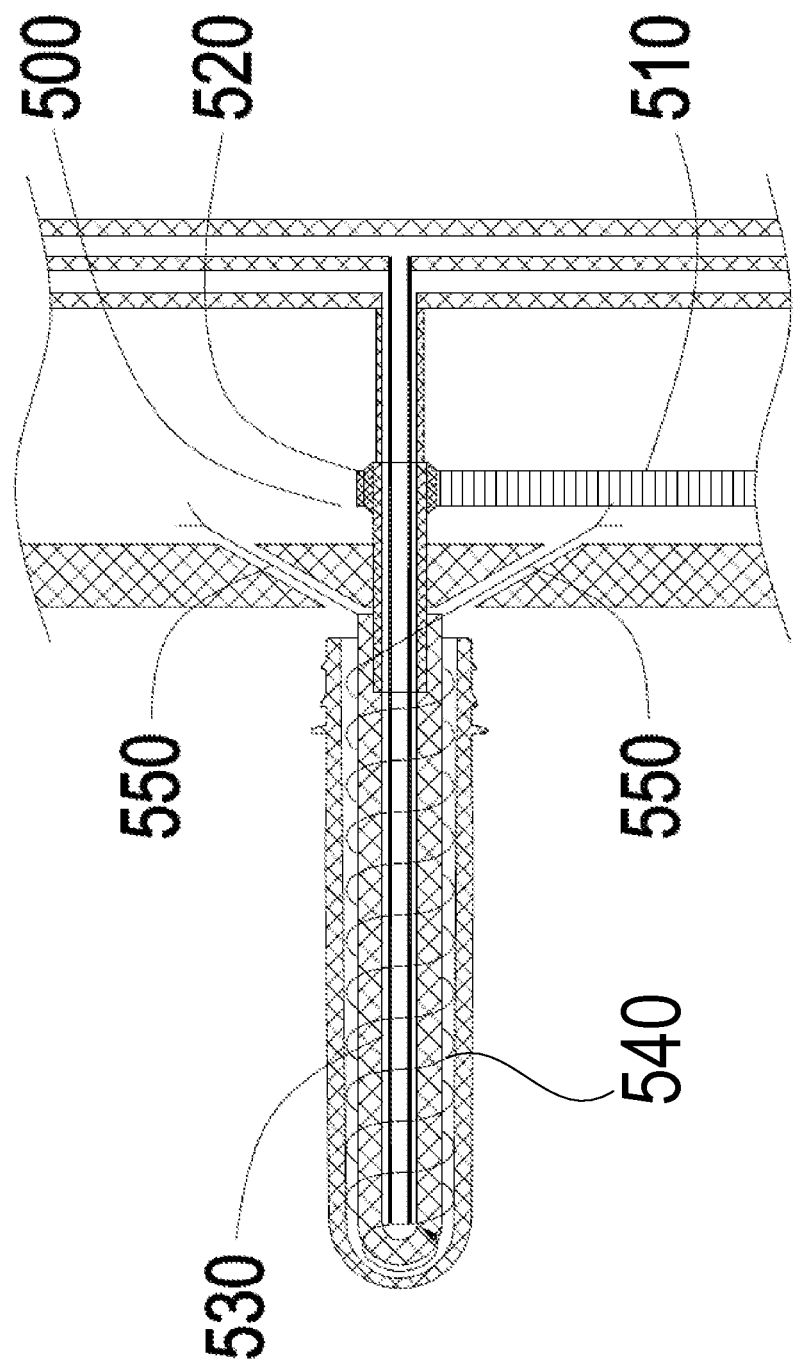
FIG. 15 is a cross-sectional side view of an eighth embodiment of an apparatus according to the present invention.

FIG. 15 shows a section view of the eighth embodiment in which the central cooling rod of FIG. 14 is provided with a rotary drive 500 comprising a belt/chain 510 that engages a pulley/sprocket 520 attached to the cooling rod 530. Driving the belt/chain 510 causes the cooling rod 530 to rotate. Rotation of the cooling rod 530 further helically directs the flow of cooling fluid to enhance the promotion of turbulent flow of the cooling fluid stream 540 supplied via the angled outlets 550. The rotary drive 500 can also be run by rack/gear or direct drive mechanisms. A sealing and rotating coupling is provided between the rotating cooling rod 530 and the non-rotating cooling fluid channels. The other features and aspects of this embodiment are similar or identical to the seventh embodiment, with like reference numerals denoting like parts.

Figure 16:
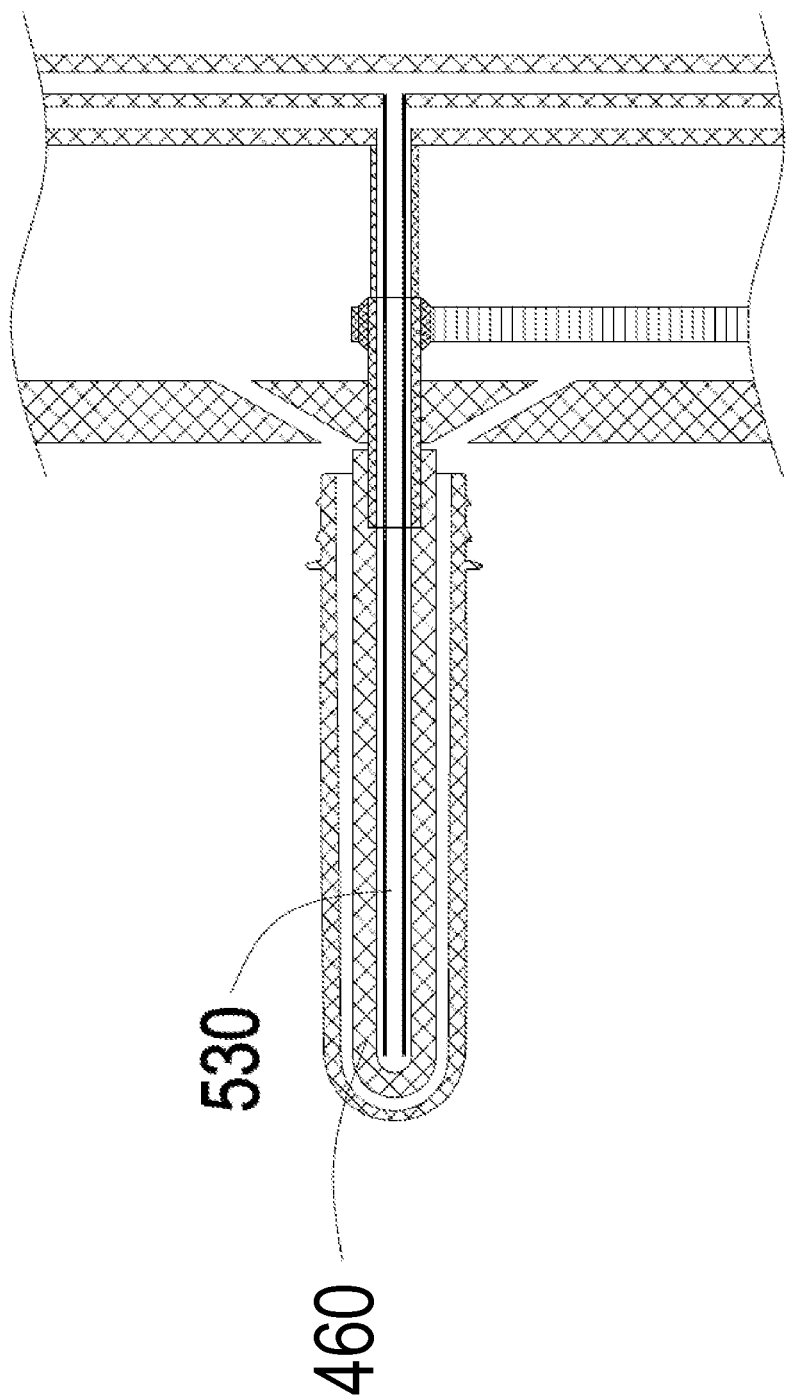
FIG. 16 is a partial cross-sectional side view of a ninth embodiment of an apparatus according to the present invention.

FIG. 16 shows a section view of the ninth embodiment in which the cooling fluid stream and angled outlets of the earlier embodiments are not used. The rotating cooled rod of FIG. 15 has been retained and its rotary motion and external cladding of geometrical surfaces or surface textures 460 alone direct the helical flow in the annular space between the inner surface of the preform and the exterior surface of the cooling rod to generate turbulence and enhance the transfer of heat from the preform to the cooling fluid flowing through the cooling rod. The other features and aspects of this embodiment are similar or identical to the eighth embodiment, with like reference numerals denoting like parts.

Figure 17:
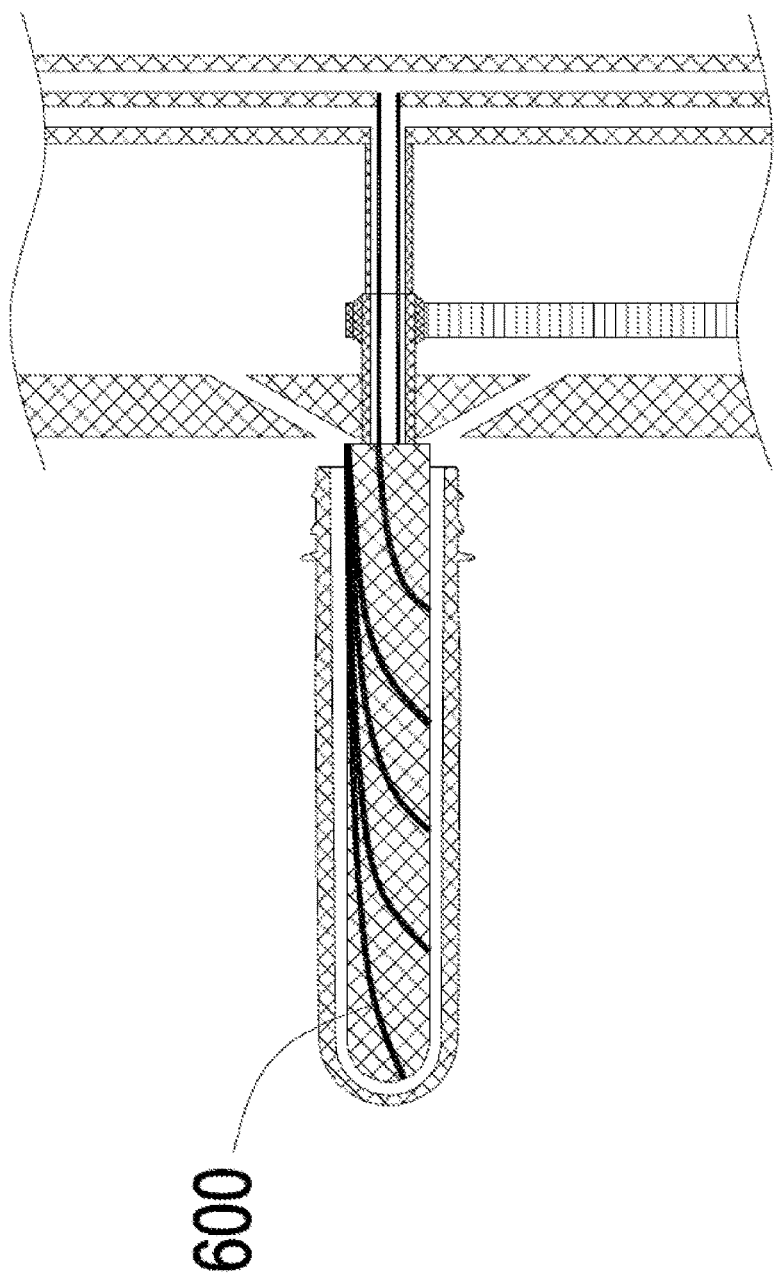
FIG. 17 is a partial cross-sectional side view of a tenth embodiment of an apparatus according to the present invention.

FIG. 17 shows a section view through the tenth embodiment in which the configuration shown in FIG. 16 is further enhanced by the addition of external surface features 600 that can be configured as fins, spirals, wings, pineapple studs, or the like, or combinations thereof to further enhance the helical flow to promote turbulence and improve the transfer of heat from the preform to the cooling fluid flowing through the cooling rod. The other features and aspects of this embodiment are similar or identical to the ninth embodiment, with like reference numerals denoting like parts.

Figure 18:
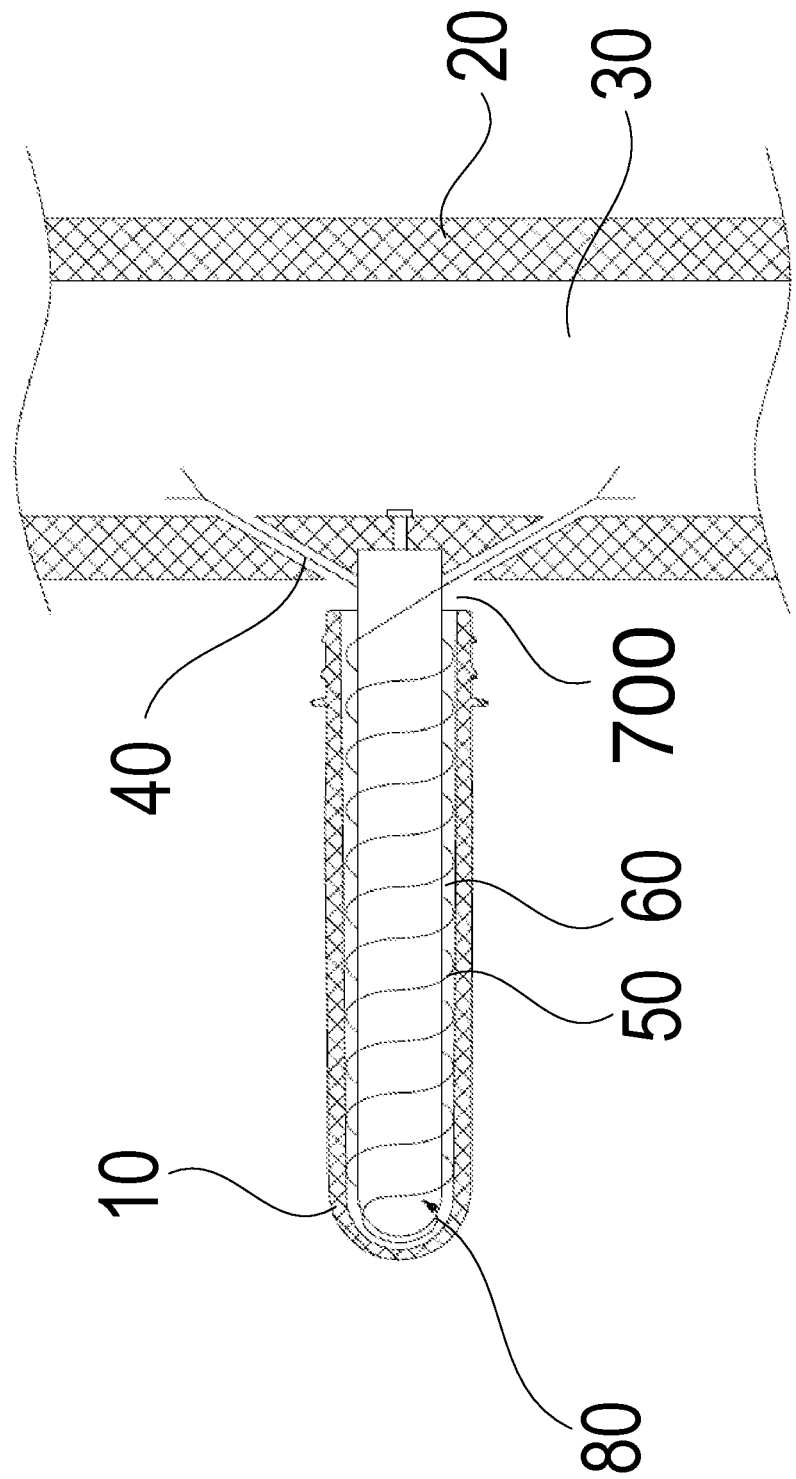
FIG. 18 is a partial cross-sectional side view of an eleventh embodiment of an apparatus according to the present invention.

FIG. 18 shows a section view of an eleventh embodiment in which a central cooling rod 700 is inserted into the preform 10. The cooling rod 700 is affixed to the plenum 20 and may be solid or may have an interior void. The length of the cooling rod 700 is long enough to reach the proximity of the closed end of the preform 10. One or more angled outlets 40 are provided in order to introduce a helical stream of cooling air. The cooling rod 700 may be surrounded by a cladding of geometrical surfaces or surface textures to enhance the promotion of turbulent flow of the cooling fluid stream supplied via angled outlets. The surface texture can be a polished surface, a golf ball texture, a rough surface, a grooved surface, or the like, or any combination thereof. The other features and aspects of this embodiment are similar or identical to the first embodiment, with like reference numerals denoting like parts. For example, the cooling rod 700 can be configured to be driven to rotate, as in other embodiments discussed herein, such as the eighth embodiment (FIG. 15).

FIGS. 19A and 19B show a twelfth embodiment in which an insert 800 is provided within a spigot 802 that extends into the preform 10. The insert 800 includes one or more external helical channels 804 formed in its outside surface 806. Pressurized cooling fluid 30 is provided by a feed channel 808, which receives cooling fluid from a source, such as the plate or plenum (not shown) discussed in other embodiments. Cooling fluid is conveyed through the spigot 802 to the outside surface 806 of the insert 800 whose helical channels 804 shape the flow of cooling fluid into a helical path. Each helical channel 804 ends at an angled outlet 810 from which jets cooling fluid in a helical stream 50 that exits the spigot 802 and enters the preform 10. The helical streams 50 of cooling fluid cool the preform 10. The insert 800 has a central exhaust channel 812 for exhausting heated cooling fluid beyond. The positions and sizes of the spigot 802 and insert 800 can be changed and the shape, size, and number (e.g., 1, 2, 3, 4, etc.) of helical channels 804 can be changed to obtain the desired effect. The other features and aspects of this embodiment are similar or identical to the first embodiment, with like reference numerals denoting like parts.

In various embodiments above, suction can be used, instead of or in addition to positive pressure, to impart motion to cooling air. This can be done with or without sealing the preform to the plate. It is contemplated that suction results in flow that is less directional/controllable, hence a contoured spiral surface or other surface feature (e.g., see FIG. 17) may be provided to draw the air stream into a suitable helical path.

The above techniques may provide for improved cooling performance, which results in a higher production rate. Further, optimized use of air may be realized, resulting in lower levels of air usage which can translate into a cost reduction. Moreover, the above techniques may result in reduced crystallization in molded articles/preforms, resulting in better blow molding performance, reduced stress, and better aesthetics. Other advantages may also be apparent to those of ordinary skill in the art.

What is claimed is:

1. A method for post-molding cooling a molded article, the method comprising:
   providing cooling fluid at an open end of the molded article;
   helically directing the cooling fluid in the molded article such that at least a portion of a concave interior surface of the molded article acts as a curved surface relative to a direction of flow of the cooling fluid to create turbulent flow of the cooling fluid against the concave interior surface of the molded article along a length of the concave interior surface from the open end of the molded article toward a closed end of the molded article; and
   venting cooling fluid out of the open end of the molded article.

2. The method of claim 1, further comprising positioning a cooling rod in the molded article, wherein the cooling fluid flows around the cooling rod.

3. A method for post-molding cooling a molded article, the method comprising:
   providing cooling fluid at an open end of the molded article;
   helically directing the cooling fluid in the molded article such that at least a portion of a concave interior surface of the molded article acts as a curved surface relative to a direction of flow of the cooling fluid to create turbulent flow of the cooling fluid against the concave interior surface of the molded article along a length of the concave interior surface from the open end of the molded article toward a closed end of the molded article; and
   conveying cooling fluid out of the molded article simultaneously with flow of cooling fluid into the molded article.

4. The method of claim 3, further comprising positioning a cooling rod in the molded article, wherein the cooling fluid flows around the cooling rod.

* * * * *